United States Patent Office 3,312,205
Patented Apr. 4, 1967

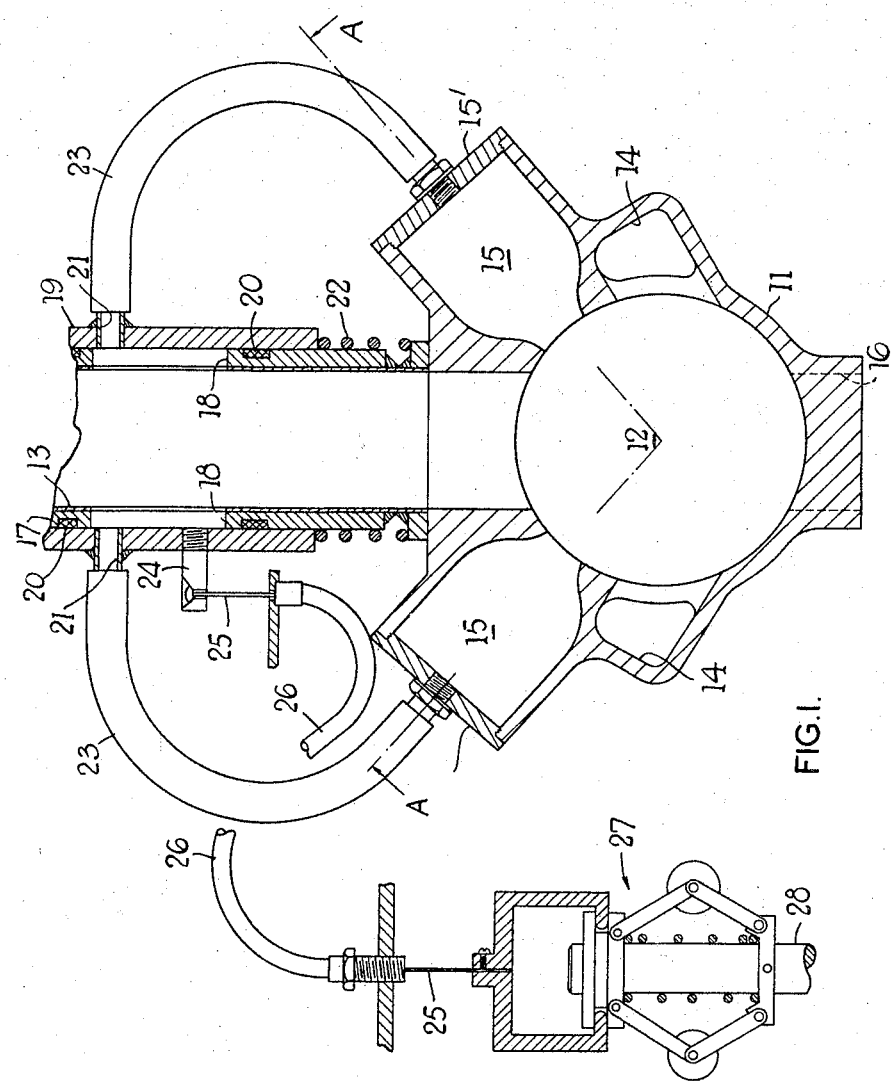

3,312,205
INTERNAL COMBUSTION ENGINES
Josef Ehrlich, London, England, assignor to Bristol Siddeley Ehrlich Engineering Limited, London, England, a British company
Filed July 19, 1965, Ser. No. 472,912
Claims priority, application Great Britain, July 20, 1964, 29,486/64
14 Claims. (Cl. 123—65)

This invention relates to internal combustion engines, and particularly to a two-stroke engine of the kind described and claimed in U.S. Patent No. 2,966,900 which, besides having an exhaust port and a main scavenging-air entry port which are uncovered by the piston towards the end of its combustion strike, is also provided with an additional port which is uncovered later than the main entry port and which communicates with a reservoir, the reservoir being in communication during part of the combustion stroke with the source of scavenging air for the main entry port but being isolated therefrom before the main entry port is uncovered, whereby the reduction of pressure which occurs in the source on the main entry port being uncovered is not accompanied by any corresponding pressure reduction in the reservoir.

In such engines, the delayed release of the scavenging air trapped under pressure in the reservoir is effective, particularly if the additional port is arranged adjacent to the exhaust port and directed towards the opposite side of the cylinder wall, and if it is arranged that the trapped air should escape into the cylinder at a velocity which is high relative to the air velocity through the main entry port, to improve both the efficiency and the degree of filling of the cylinder space, as well as the scavenging of the combustion products.

It has been found that in an engine of this kind the effectiveness of the trapped air may be increased by providing that the interior of the reservoir shall communicate with an exhaust duct leading from the exhaust port, thereby to subject the trapped air to pulses of increased pressure due to high pressure conditions which prevail periodically in the exhaust duct during runing of the engine; and it is an object of the present invention to provide an engine, of the kind referred to, in which the effectiveness of the trapped air is increased in this manner.

According to the present invention there is provided a two-stroke internal combustion engine comprising a cylinder, a piston reciprocable in the cylinder, a combustion space within the cylinder and above the piston, an exhaust port so disposed in the cylinder wall as to be opened to the combustion space by the piston towards the end of the combustion stroke thereof, a main entry port so disposed in the cylinder wall as to be opened to the combustion space by the piston later in the combustion stroke thereof than the exhaust port, a source of scavenging air in communication with the main entry port, an additional entry port so disposed in the cylinder wall as to be opened to the combustion space by the piston later in the combustion stroke thereof than the main entry port, and a reservoir in communication with the additional entry port, the reservoir being in communication with the said source of scavenging air during part of the combustion stroke but becoming isolated therefrom before the main entry port is opened by the piston thereby maintaining pressure within the reservoir until opening of the additional entry port by the piston, wherein there is provided an exhaust duct communicating with the exhaust port, pressure take-off means communicating with the exhaust duct interior at a controllably variable distance from the exhaust port, and duct means connecting the reservoir to the take-off means and, therethrough, to the exhaust duct interior.

Preferred embodiments of a two-stroke engine according to the invention are described below with reference to the accompanying drawings, in which:

FIGURE 1 is a transverse section through the cylinder block and exhaust duct of such an engine, showing also one arrangement of control means therefor;

Figure 1A:
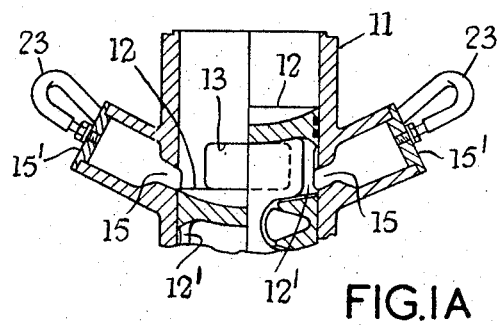
FIGURE 1A is a vertical sectional view, taken on the lines A—A of FIGURE 1 and on a smaller scale, through the piston and cylinder of the engine shown in FIGURE 1, the right-hand and left-hand halves of FIGURE 1A showing the piston in two different positions.

The engine represented in FIGURES 1 and 1A comprises a cylinder block 11, within which a piston 12 is reciprocable, the block 11 being formed with an exhaust port and an exhaust duct 13 leading therefrom, two main scavenging-air entry ports and a respective duct 14 leading to each of them from the engine crankcase (not shown), and two additional ports and respective reservoir chambers 15 (closed-off, in principle, by covers 15′) into which the additional ports lead. The block 11 is also formed with an inlet duct 16 through which, when the piston is near its upper dead-centre position, air is drawn in known manner into the crankcase to be compressed therein by the descending piston after the piston, during its descent, has shut off the inlet duct 16 from the crankcase.

The exhaust port is of greater height than the main entry ports, so that it opens earlier as the piston approaches its bottom dead centre position; and the main entry ports are in turn of greater height than the additional ports, so that these latter open last of all into the combustion space above the piston. However, the piston skirt is provided with windows or slots 12′ so that, until shortly before the main entry ports are opened to the combustion space, the additional ports are in communication, through the piston wall and below the piston, with the crankcase as shown in the right-hand half of FIGURE 1A. Thus, as the piston descends and compresses the air in the crankcase, both the ducts 14 (which at their lower ends are always in communication wtih the crankcase) and the reservoir chambers 15 are filled with air under pressure until the point is reached where the upper part of the descending piston (i.e. the part above the windows 12′) covers the additional ports and isolates the chambers 15 from the crankcase. Almost immediately thereafter, the piston begins to uncover the main entry ports and air under pressure in the ducts 14 and in the crankcase flows therethrough into the cylinder, above the piston to scavenge and fill the combustion space (the exhaust port being already open by then). The resulting pressure fall in the crankcase does not effect the pressure in the chambers 15, since these are already isolated, and the air trapped in them escapes to boost the scavenging and filling process when the additional ports in their turn are opened to the combustion space. As described thus far, the engine shown in FIGURE 1 corresponds to one of the two engines illustrated in the above-mentioned U.S. Patent No. 2,966,900.

In accordance with the present invention, however, the end of the exhaust duct 13 adjacent the exhaust port in the cylinder block 11 is surrounded by a tight-fitting sleeve 17, and in the duct and sleeve are formed a pair of diametrically-opposed longitudinal slots 18. An outer sleeve 19 is slidably mounted on the sleeve 17, which is provided with sealing rings 20 providing seals between the two sleeves. The outer sleeve 19 has two outlet apertures 21 each communicating inwardly with one of the slots 18, and the sleeve 19 is urged by a spring 22 away from the cylinder block to a position in which the apertures 21 are adjacent the remote end of the slots 18. Outwardly, the outlet apertures 21 open each into one end of a respective duct means in the form of a flexible hose 23, the respective other ends of which are secured to the covers 15' and communicate, through respective apertures therein, with the interiors of the reservoir chambers 15.

As is well known, during each working cycle of the engine a wave of high pressure travels along the exhaust duct as the piston begins to uncover the exhaust port, and it will be appreciated that, because of the above-described connection of the reservoir chambers 15 to the exhaust duct 13 through the hoses 23, each such pressure wave results in a pulse of relatively high pressure being transmitted to the interiors of the reservoir chambers 15. The timing of these pulses, relative to other events during the working cycle (notably the opening of the additional ports to the cylinder) can be controlled by varying the position of the sleeve 19, movement of the sleeve 19 against the urging of the spring 22 resulting in the timing of the pulses being advanced. It will be understood that by this means it can be arranged that the high-pressure pulses are effective in the reservoir chambers 15 (and, more particularly, at the ends thereof into which the additional ports open) just when the additional ports are open, or are being opened by the descending piston, to the cylinder and thus just when the increase in pressure is best calculated to increase the effectiveness, as it escapes into the cylinder, of the air which has been trapped in the reservoir chambers.

With varying engine speeds, the optimum position of the sleeve 19 will also vary, since the time taken for a pulse to travel from the outlets 21 to the additional ports of the engine is substantially constant whereas the time interval between opening of the exhaust and additional ports is dependent on the speed of the descending piston. As shown in FIGURE 1, the engine is provided with control means for automatically varying the position of the sleeve 19 in dependence on engine speed. To that end, the sleeve 19 is provided with a pin 24 which is engaged by one end of a flexible cable 25 which passes through an outer sheath 26 with fixedly mounted ends and of which the other end is connected to a centrifugal actuator 27 rotated by a shaft 28 which is geared to the engine. It will be apparent from the drawing that, as the engine speed and the speed of the shaft 28 increase, the centrifugal actuator acts to pull the cable 25 through its sheath and thus, against the urging of the spring 22, to move the sleeve 19 increasingly nearer the cylinder block 11 thereby to shorten the time lapse from uncovering of the exhaust port to arrival of the high pressure pulses in the reservoir chambers 15.

Figure 2:
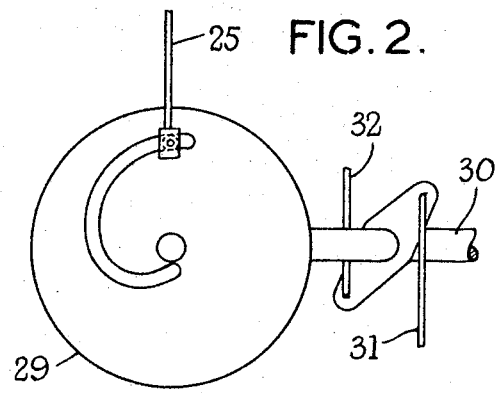
FIGURE 2 represents an alternative arrangement of control means for the engine shown in FIGURES 1 and 1A.

There may be circumstances (for instance, in an engine governed to be run at constant speed) where it is not necessary to provide for variation of the pressure-pulse take-off points, in which case the illustrated arrangement of slots 18 and the slidable sleeve 19 would be unnecessary. Again, when variation of this kind is provided for, it may be found convenient and satisfactory to control the position of the sleeve 19 in dependence, not on engine speed directly, as in FIGURE 1, but on some other variable of the engine. For example, the cable 25 of the engine shown in FIGURE 1 may be connected not to the centrifugal actuator 27 there shown but, instead, and as shown in FIGURE 2, to a cam follower riding in a cam slot of a disc 29 mounted on a shaft 30 which is rotatable by pulling on a rod 31 connected to an accelerator or throttle control of the engine, pulling on this rod 31 also serving to push a rod 32 to adjust the setting of a carburetor (not shown) of the engine. Alternatively the cable 25 could be connected to means for adjusting the position of the sleeve 19 manually, independently of any other control or variable function of the engine, or the engine could be provided with other means for effecting independent manual adjustment of the position along the exhaust duct of the take-off points of the pressure pulses.

Experimental results with a high-speed engine embodying the present invention suggest that the improvement in engine performance which are obtainable by its use may amount to at least 5%.

It will be understood that although in the foregoing description and appended claims reference is made throughout to "scavenging air" and to the intake of "air" through the inlet duct 16, this being strictly correct in respect of engines in accordance with the invention and of the fuel-injection type, this "air" may equally, in the case of other engines according to the invention, be air which already contains the necessary fuel (having been drawn through a carburetor, for instance, before reaching the inlet duct 16); and references to "air" in the appended claims are to be construed accordingly.

What I claim is:

1. A two-stroke internal combustion engine comprising a cylinder, a piston reciprocable in the cylinder, a combustion space within the cylinder and above the piston, an exhaust port so disposed in the cylinder wall as to be opened to the combustion space by the piston towards the end of the combustion stroke thereof, a main entry port so disposed in the cylinder wall as to be opened to the combustion space by the piston later in the combustion stroke thereof than the exhaust port, a source of scavenging air in communication with the main entry port, an additional entry port so disposed in the cylinder wall as to be opened to the combustion space by the piston later in the combustion stroke thereof than the main entry port, and a reservoir in communication with the additional entry port, the reservoir being in communication with the said source of scavenging air during part of the combustion stroke but becoming isolated herefrom before the main entry port is opened by the piston thereby maintaining pressure within the reservoir until opening of the additional entry port by the piston, wherein there is provided an exhaust duct communicating with the exhaust port, pressure take-off means communicating with the exhaust duct interior at a controllably variable distance from the exhaust port, and duct means connecting the reservoir to the take-off means and, therethrough, to the exhaust duct interior.

2. An engine as claimed in claim 1 and provided with crankcase compression of the scavenging air and in which the crankcase constitutes the said source of scavenging air and is in communication with the main entry port.

3. An engine as claimed in claim 2, wherein the piston is provided in its skirt with a window or slot through which the additional entry port and, therethrough, the reservoir are in communication with the interior of the piston and with the crankcase during the combustion stroke before the piston opens the main entry port to the combustion space.

4. An engine as claimed in claim 1, wherein the said pressure take-off means comprises an apertured sleeve surrounding the exhaust duct and displaceable lengthwise thereof, the exhaust duct having a slot extending lengthwise thereof and the sleeve having an aperture in register with said slot and otherwise covering said slot.

5. An engine as claimed in claim 4, and comprising means resiliently urging the said sleeve away from the exhaust port.

6. An engine as claimed in claim 4, and provided with crankcase compression of the scavenging air, the crankcase constituting the said source of scavenging air, wherein the piston is provided in its skirt with a window or slot through which the additional entry port and, therethrough, the reservoir are in communication with the interior of the piston and with the crankcase during the combustion stroke before the piston opens the main entry port to the combustion space.

7. An engine as claimed in claim 6, and comprising means resiliently urging the said sleeve away from the exhaust port.

8. An engine as claimed in claim 1, and provided with means responsive to engine speed and operatively connected to the pressure take-off means to adjust the distance thereof from the exhaust port in inverse relationship with engine speed.

9. An engine as claimed in claim 4 and provided with means responsive to engine speed and operatively connected to the pressure take-off means to adjust the distance thereof from the exhaust port in inverse relationship with engine speed.

10. An engine as claimed in claim 6 and provided with means responsive to engine speed and operatively connected to the pressure take-off means to adjust the distance thereof from the exhaust port in inverse relationship with engine speed.

11. An engine as claimed in claim 1, wherein the pressure take-off means is linked to accelerator control means of the engine, for movement therewith.

12. An engine as claimed in claim 4, wherein the pressure take-off means is linked to accelerator control means of the engine, for movement therewith.

13. An engine as claimed in claim 6, wherein the pressure take-off means is linked to accelerator control means of the engine, for movement therewith.

14. A crankcase-compression two-stroke internal combustion engine comprising a cylinder, a piston having a skirt with a slot formed therein, reciprocable in the cylinder and serving to compress scavenging air in the crankcase below the piston, a combustion space within the cylinder and above the piston, an exhaust port so disposed in the cylinder wall as to be opened to the combustion space by the piston towards the end of the combustion stroke thereof, a main entry port in communciation with the crankcase and so disposed in the cylinder wall as to be opened to the combustion space by the piston later in the combustion stroke thereof than the exhaust port, an additional entry port so disposed in the cylinder wall as to be opened to the combustion space by the piston later in the combustion stroke thereof than the main entry port, and a reservoir in communication with the additional entry port, the reservoir being in communication through the said slot in the skirt of the piston with the piston interior and with the crankcase during part of the combustion stroke but becoming isolated therefrom by the piston before the main entry port is opened by the piston, thereby maintaining pressure within the reservoir until opening of the additional entry port by the piston, wherein there is provided an exhaust duct communicating with the exhaust port and formed with a slot extending lengthwise of the exhaust duct, pressure take-off means comprising an apertured sleeve surrounding the exhaust duct and displaceable lengthwise thereof with an aperture of the said sleeve in register with the said slot and the said slot being otherwise covered by the said sleeve, duct means connecting the reservoir to the take-off means and, therethrough, to the exhaust duct interior, and means responsive to engine speed and operatively connected to the pressure take-off means to adjust the distance thereof from the exhaust port in inverse relationship with engine speed.

No references cited.

MARK NEWMAN, *Primary Examiner.*

W. E. BURNS, *Assistant Examiner.*